(12) United States Patent
Yamane et al.

(10) Patent No.: US 9,321,332 B2
(45) Date of Patent: Apr. 26, 2016

(54) SMART ENTRY SYSTEM

(71) Applicant: HONDA MOTOR CO., LTD., Tokyo (JP)

(72) Inventors: Katsuyasu Yamane, Wako (JP); Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/466,169

(22) Filed: Aug. 22, 2014

(65) Prior Publication Data
US 2015/0057896 A1 Feb. 26, 2015

(30) Foreign Application Priority Data
Aug. 26, 2013 (JP) ................................. 2013-174326

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60J 5/04* | (2006.01) |
| *B60R 1/062* | (2006.01) |
| *B60R 25/24* | (2013.01) |
| *B60R 16/023* | (2006.01) |
| *B60J 3/04* | (2006.01) |

(52) U.S. Cl.
CPC ................. *B60J 5/047* (2013.01); *B60R 1/062* (2013.01); *B60R 16/023* (2013.01); *B60R 25/24* (2013.01); *B60J 3/04* (2013.01)

(58) Field of Classification Search
CPC ............. B60J 5/047; B60J 3/04; B60R 25/24; B60R 16/023; B60R 1/062

USPC ...................... 701/49; 340/426.28, 542, 572.9
See application file for complete search history.

(56) References Cited

U.S. PATENT DOCUMENTS

| | | | | |
|---|---|---|---|---|
| 5,495,224 A | * | 2/1996 | Adar ...................... | B60R 25/104 116/67 R |
| 6,847,288 B1 | * | 1/2005 | Baschnagel, III ... | B60R 25/1001 307/10.2 |
| 7,224,265 B2 | * | 5/2007 | Urick ...................... | B60R 1/074 340/12.22 |
| 7,474,203 B2 | * | 1/2009 | Urick ...................... | B60R 1/074 340/426.12 |
| 8,093,987 B2 | * | 1/2012 | Kurpinski ........... | B60R 25/2009 340/426.15 |
| 2004/0075532 A1 | * | 4/2004 | Ueda ........................ | E05B 77/48 340/5.72 |
| 2004/0119628 A1 | * | 6/2004 | Kumazaki ........... | B60R 25/2009 341/176 |
| 2006/0284388 A1 | * | 12/2006 | Nakashima .......... | B60G 17/018 280/6.152 |
| 2007/0200668 A1 | * | 8/2007 | Kurpinski ........... | B60R 25/2009 340/5.64 |

FOREIGN PATENT DOCUMENTS

JP 2011-184895 9/2011

* cited by examiner

*Primary Examiner* — Jaime Figueroa
(74) *Attorney, Agent, or Firm* — Rankin, Hill & Clark LLP

(57) ABSTRACT

A smart entry system has an auto lock mode in which an auto lock function to automatically lock at least one door of the vehicle is executed in response to detection that a mobile device has got away from the vehicle, and the smart entry system includes: at least one movable member visually recognizable from outside the vehicle; and a control section that, once the vehicle shifts to the auto lock mode, actuates the at least one movable member to a predetermined state. Examples of the at least one movable member include electric folding door mirrors, vehicle height adjustment devices, electric sun shades, and pop-up door handles.

8 Claims, 9 Drawing Sheets

SMART ENTRY SYSTEM

FIELD OF THE INVENTION

The present invention relates to a smart entry system which can inform a passenger of an operating state of an auto lock function of a vehicle by changing a state of a movable member or a degree of light transmission of a window glass in response to the operating state of the auto lock function.

BACKGROUND OF THE INVENTION

Japanese Patent Application Laid-Open Publication No. 2011-184895 (hereinafter referred to as "the relevant patent literature"), for example, discloses a smart entry system which is constructed to inform of an operating state of an auto lock function, and which can inform, by means of a vehicle buzzer (beep) and a vehicle indicator, a passenger that the vehicle has shifted to an auto lock mode. When a predetermined condition for locking vehicle doors has been established, the smart entry system disclosed in the relevant patent literature sounds the vehicle buzzer and changes a display of the vehicle indicator so that the passenger present outside the vehicle can recognize an operating state of the auto lock function.

According to the disclosure of the relevant patent literature, the vehicle buzzer sounds once and the vehicle indicator is illuminated in green color, for example, once the predetermined condition for locking the vehicle doors is established and the vehicle shifts to the auto lock mode. The vehicle buzzer sounds two times and the vehicle indicator turns off, for example, once the auto lock function is executed to close the vehicle doors. By the sounding of the vehicle buzzer and the changed display of the vehicle indicator, the passenger can recognize the operating state of the auto lock function.

Namely, with the smart entry system disclosed in the relevant patent literature, the passenger can recognize the operating state of the auto lock function auditorily through the sounding of the vehicle buzzer and visually through the display of the vehicle indicator. However, the passenger may sometimes be unable to hear the sounding of the vehicle buzzer in places where ambient noise sound is too great. Also, the passenger may sometimes be unable to recognize the illumination of the vehicle indicator in too light places. Further, it tends to be difficult for the passenger to recognize the illumination of the vehicle indicator when the passenger is considerably away from the vehicle. Thus, with the smart entry system disclosed in the relevant patent literature, there may occur a situation where the passenger is unable to recognize the operating state of the auto lock function even when the operating state is informed to the passenger. In such a case, the passenger may undesirably leave the vehicle with the doors left unlocked without the passenger noticing that the doors have not been locked.

SUMMARY OF THE INVENTION

In view of the foregoing prior art problems, it is an object of the present invention to provide an improved smart entry system which allows a passenger to reliably recognize an operating state of the auto lock function of the vehicle. Other objects of the present invention will become apparent to a person skilled in the art with reference the description of preferred embodiments of the present invention and the accompanying drawings.

In order to accomplish the above-mentioned object, the present invention provides an improved smart entry system having an auto lock mode in which an auto lock function to automatically lock at least one door of a vehicle is executed in response to detection that a mobile device associated with the auto lock function has got away from the vehicle, which comprises: at least one movable member provided on the vehicle in such a manner as to be visually recognizable from outside the vehicle; and a control section that, once the vehicle shifts to the auto lock mode, actuates the at least one movable member to a predetermined state. With the arrangement that, once the vehicle shifts to the auto lock mode, the movable member provided on the vehicle is actuated to the predetermined state, a passenger of the vehicle can reliably recognize that the vehicle has shifted to the auto lock mode.

In an embodiment, the at least one movable member is at least one electric folding door mirror of the vehicle, and the predetermined state is where the at least one electric folding door mirror of the vehicle is in a third position between a first position that is an opened position of the door mirror and a second position that is a stored position of the door mirror. With the arrangement that, once the vehicle shifts to the auto lock mode, the electric folding door mirror of the vehicle moves to and stops at the third position between the opened position and the stored position, the passenger of the vehicle can reliably recognize that the vehicle has shifted to the auto lock mode.

In an embodiment, the at least one movable member is vehicle height adjustment devices of the vehicle, and the predetermined state is where the vehicle is held by the vehicle height adjustment devices at a predetermined vehicle height having changed relative to a vehicle height before the vehicle's shifting to the auto lock mode and/or a vehicle height after the automatic locking of the door. With the arrangement that, once the vehicle shifts to the auto lock mode, the vehicle height is changed relative to the vehicle height before the vehicle's shifting to the auto lock mode and/or the vehicle height after the automatic locking of the door, the passenger of the vehicle can reliably recognize that the vehicle has shifted to the auto lock mode.

In an embodiment, the at least one movable member is at least one electric sun shade provided in a passenger compartment of the vehicle adjacent to a window glass of the vehicle, and the predetermined state is where the sun shade is in a pull-out state having changed relative to a pull-out state before the vehicle's shifting to the auto lock mode and/or a pulled-out state after the automatic locking of the door. With the arrangement that, once the vehicle's shifts to the auto lock mode, the pulled-out state of the sun shade is changed relative to the pull-out state before the vehicle's shifting to the auto lock mode and/or the pulled-out state after the automatic locking of the door, the passenger of the vehicle can reliably recognize that the vehicle has shifted to the auto lock mode.

In an embodiment, the at least one movable member is a pop-up door handle provided on the at least one door, and the predetermined state is where the pop-up door handle is in a projected state having changed relative to a projected state before the vehicle's shifting to the auto lock mode and/or a projected state after the automatic locking of the door. With the arrangement that, once the vehicle shifts to the auto lock mode, the projected state of the pop-up door handle is changed relative to the projected state before the vehicle's shifting to the auto lock mode and/or the projected state after the automatic locking of the door, the passenger of the vehicle can reliably recognize that the vehicle has shifted to the auto lock mode.

Further, in an embodiment, once the vehicle shifts to the auto lock mode, the control section not only actuates the at least one movable member to the predetermined state but also illuminates or blinks a lamp provided on a predetermined position of the vehicle visually recognizable from outside a passenger compartment. Whether or not the movable member is in the predetermined state can be readily visually recognizable by the passenger viewing the vehicle at a considerable from the vehicle. On the other hand, the illuminated or blinking state of the lamp provided on the predetermined position of the vehicle visually recognizable from outside the passenger compartment can be readily visually recognizable by the passenger viewing the vehicle at a short distance from the vehicle. Thus, the passenger of the vehicle can reliably recognize that the vehicle has shifted to the auto lock mode, irrespective of timing or position at which the passenger views the vehicle to check whether the vehicle has duly shifted to the auto lock mode.

According to another aspect of the present invention, there is provided an improved smart entry system having an auto lock mode in which an auto lock function to automatically lock at least one door of the vehicle is executed in response to detection that a mobile device associated with the auto lock function has got away from the vehicle, which comprises: at least one window glass of the vehicle; and a control section that controls a degree of light transmission of the at least one window glass. Once the vehicle shifts to the auto lock mode, the control section controls the degree of light transmission of the at least one window glass to change to a first degree of light transmission different from the degree of light transmission before the vehicle's shifting to the auto lock mode. Once the auto lock function is executed and the door of the vehicle is locked, the control section controls the degree of light transmission of the at least one window glass to change to a second degree of light transmission different from the first degree of light transmission. With the arrangement that, once the vehicle shifts to the auto lock mode, the degree of light transmission of the window glass is controlled to change to the first degree of light transmission, the passenger of the vehicle can reliably recognize that the vehicle has shifted to the auto lock mode. Further, because the degree of light transmission of the window glass to change to the second degree of light transmission in response to the auto lock function being executed to lock the door of the vehicle, the passenger of the vehicle can reliably recognize that the door of the vehicle has been locked. Further, by setting the second degree of light transmission relatively low, the present invention can achieve an increased security effect by preventing any unauthorized persons from looking for things for a theft purpose.

In an embodiment, the first degree of light transmission is a degree of light transmission of a predetermined portion of the at least one window glass, and the predetermined portion of the at least one window glass visually displays thereon at least one of a character/letter, figure and design. With the arrangement that, once the vehicle shifts to the auto lock mode, at least one of a character/letter, figure and design is displayed on the window glass of the vehicle, the passenger of the vehicle can reliably recognize that the vehicle has shifted to the auto lock mode.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

1. Overall Construction

Figure 1:
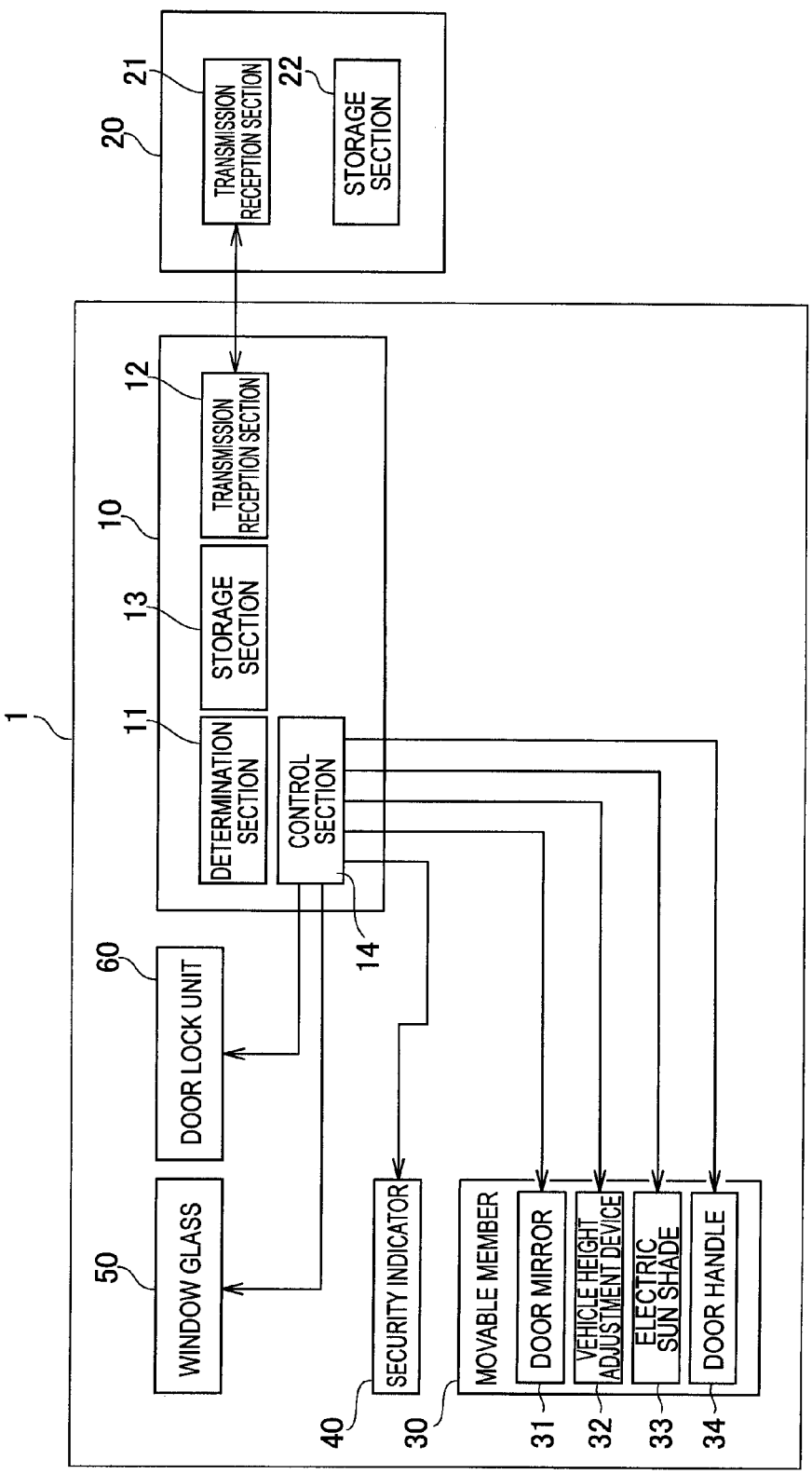
FIG. 1 is a block diagram showing an example overall construction of a smart entry system of the present invention.

The following describe, with reference to FIG. 1, an example overall construction of a smart entry system of the present invention. A later-described first embodiment of the smart entry system of the present invention includes an ECU 10 provided in a vehicle 1, and at least one movable member 30. A later-described second embodiment of the smart entry system of the invention includes window glasses 50 in place of the movable members 30. The first embodiment of the smart entry system may further include a mobile device 20 associated with an auto lock function of the smart entry system, a security indicator (lamp) 40, window glasses 50, door lock units 60, etc. Further, the second embodiment of the smart entry system may further include the mobile device 20, the security indicator (lamp) 40, the door lock units 60, etc.

The ECU 10, which is for example in the form of a microcomputer, includes a determination section 11, a transmission/reception (communication) section 12, a storage section 13, a control section 14, etc. In FIG. 1, the control section 14 is shown as outputting signals to the movable member 30, security indicator 40, window glasses 50, door lock units 60, etc., to facilitate the description. Actually, however, a not-shown I/O interface section provided in the ECU 10 outputs signals via an in-vehicle LAN. The transmission/reception section 12 of the ECU 10 is capable of wireless communication with a transmission/reception (communication) section 21 of the mobile device 20. More specifically, the transmission/reception section 12 of the ECU 10 communicates signals with the transmission/reception section 21 of the mobile device 20 via transmission/reception antennas provided inside a passenger compartment and/or outside the vehicle.

The mobile device 20 includes the transmission/reception section 21 capable of wireless communication with the transmission/reception section 12 of the ECU 10, and the storage section 22 storing ID information of the ECU 10. The mobile device 20 has a size designed such that a passenger can carry the mobile device 20.

As shown in FIG. 1, examples of the movable member 30 include electric folding door mirrors 31, vehicle height adjustment devices 32, electric sun shades 33 and pop-up door handles 34. However, the present invention is not so limited, and examples of the movable member 30 may further include other electrically-controlled movable members, such as a windshield wiper and a radio antenna. Further, such movable members may have their respective actuators, control sections or ECUs (not shown).

The security indicator 40 is provided for displaying that an anthitheft device of the vehicle is currently in operation. The security indicator 40 is provided, for example, on a not-shown meter panel, a not-shown steering column, or the like.

The window glasses 50 are each constructed in such a manner that a degree of light transmission of the glass surface can be varied or changed by electric control. If a liquid crystal panel is employed as the window glass 50, the degree of light transmission can be increased by application of electric voltage to the liquid crystal panel. Thus, by controlling the intensity of the electric voltage to be applied, it is possible to control the degree of light transmission of the glass surface.

The door lock units 60 are connected to not-shown door lock actuators provided, for example, in individual vehicle doors. When a signal for locking or unlocking the vehicle doors is received, for example, from the ECU 10, the door lock units 60 control the door lock actuators to lock or unlock the vehicle doors.

Figure 2:
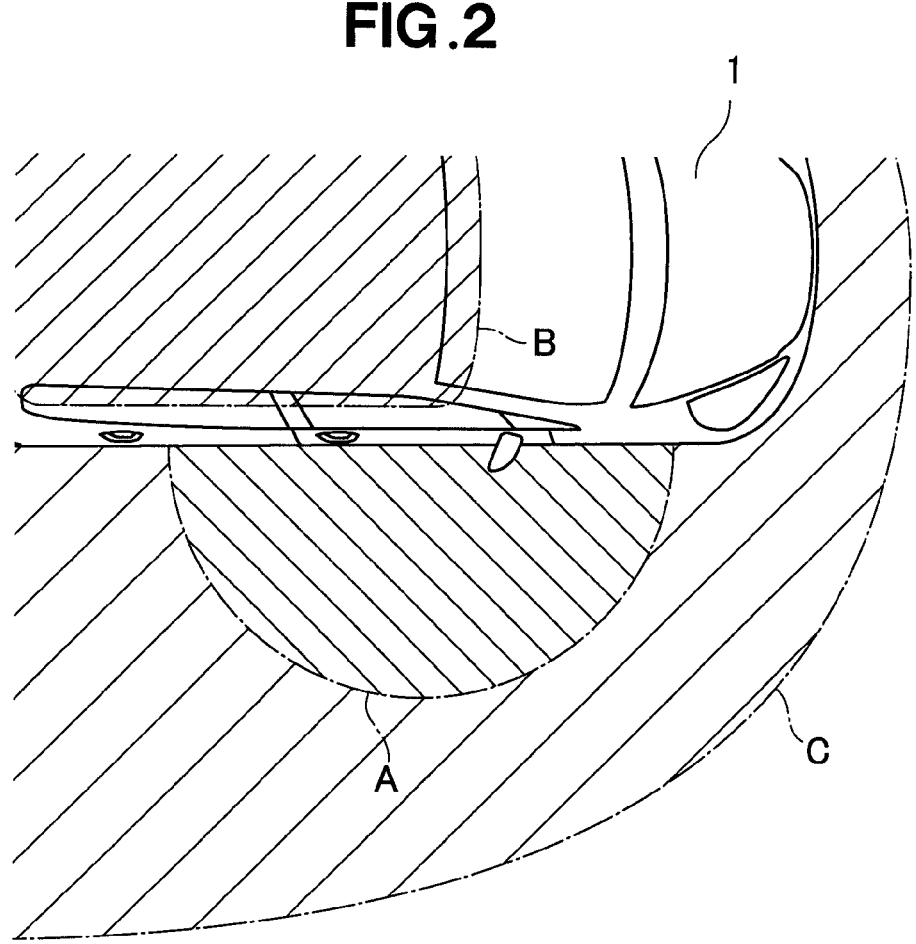
FIG. 2 is a view showing communication areas employed in an auto lock function of the smart entry system.

Now, with reference to FIGS. 1 and 2, a description will be given about general behavior of the auto lock function of the smart entry system. FIG. 2 is a diagram showing various communication areas employed in the auto lock function. Namely, reference character A in FIG. 2 indicates a communication area where, for example, the transmission/reception section 21 of the mobile device 20 can receive a first request signal transmitted from the transmission/reception section 12 of the ECU 10. For example, a transmission range of the first request signal from the transmission/reception section 12 of the ECU 10 is set not to exceed two meters from the vehicle. Further, reference character B in FIG. 2 indicates a communication area where, for example, the transmission/reception section 21 of the mobile device 20 can receive a second request signal transmitted from the transmission/reception section 12 of the ECU 10. For example, a transmission range of the second request signal from the transmission/reception section 12 of the ECU 10 is set to coincide with an area of the interior of a passenger compartment. Furthermore, reference character C in FIG. 2 indicates a communication area where the transmission/reception section 21 of the mobile device 20 can receive a third request signal transmitted from the transmission/reception section 12 of the ECU 10. For example, a transmission range of the third request signal from the transmission/reception section 12 of the ECU 10 is set to be greater than the above-mentioned communication are A.

In response to receipt of any one of the first to third request signals from the transmission/reception section 12 of the ECU 10, the mobile device 20 transmits, by means of the transmission/reception section 21, any one of first to third reply signals corresponding to the received request signal together with the ID information of the ECU 10 stored in the storage section 22. Once the transmission/reception section 12 of the ECU 10 receives any one of the first to third reply signals from the mobile device 20, the CPU 11 determines whether or not the ID information of the ECU 10 included in the received reply signal matches the ID information of the ECU 10 stored in the storage section 13 of the ECU 10.

Even when the transmission/reception section 21 of the mobile device 20 has received two or more of the request signals from the ECU 10, the mobile device 20 transmits, via the transmission/reception section 21, any one of the reply signals on the basis of a preset priority order. As an example, the preset priority order may be one defining that the second replay signal has the highest priority, the first reply signal has the second highest priority and the third reply signal has the lowest priority.

Let it be assumed here that the transmission/reception section 12 of the ECU 10 has received the first reply signal including ID information matching the ID of the ECU 10. Then, the determination section 11 of the ECU 10 determines that a passenger having with it (her or him) the mobile device 20 with ID information matching the ID of the ECU 10 is present, for example, within the area A. Let it be further assumed that the transmission/reception section 12 of the ECU 10 has then received the third reply signal including ID information matching the ID of the ECU 10. Then, the determination section 11 of the ECU 10 determines that the passenger having with it the mobile device 20 with ID information matching the ID of the ECU 10 has moved, for example, from within the area A to the area C, and thus, the control section 14 controls the door lock units 60 to lock the vehicle doors. Thus, there is activated the auto lock function (auto lock mode) in which the vehicle doors are locked in response the passenger having with it the mobile device 20 only moving away from the vehicle without performing any operation. Here, the auto lock mode lasts from the time at which the determination section 11 determines that the passenger having with it (her or him) the mobile device 20 with the ID information matching the ID of the ECU 10 is present, for example, within the area A to the time that the control section 14 controls the door lock units 60 to lock the vehicle doors. Namely, timing at which the vehicle shifts to the auto lock mode is when the determination section 11 has determined that the passenger having with it (her or him) the mobile device 20 with the ID information matching the ID of the ECU 10 is present, for example, within the area A.

2. Example Behavior of the First Embodiment

The first embodiment is characterized by controlling the movable member 30 in such a manner that the passenger can recognize an operating state of the auto lock function by visually recognizing behavior of the movable member 30. The following describe, with reference to a control flow chart of FIG. 3, example behavior of the first embodiment of the system where an operating state of the auto lock function is informed through behavior of the movable member 30. At step S101, the determination section 11 of the ECU 10 determines whether or not the vehicle has shifted to the auto lock mode, i.e. whether or not the transmission/reception section 12 of the ECU 10 has received the first reply signal including an ID matching the ID of the ECU 10. With a YES determination at step S101, the control flow proceeds to next step S102, while with a NO determination at step S101, the determination section 11 repeats the determination at step S101.

At step S102, the control section 14 of the ECU 10 outputs a control signal such that the movable member 30 is placed in a first state. Thus, that the vehicle has shifted to the auto lock mode is informed to the passenger by the movable member 30 having shifted to a state (first state) changed (different) from the state which the movable member 30 was is before the vehicle's shifting to the auto lock mode.

At next step S103, the determination section 11 of the ECU 10 determines whether the mobile device 20 has got away from the vehicle 1, i.e. whether or not the transmission/reception section 12 of the ECU 10 has received the third reply signal including an ID matching the ID of the ECU 10. With a YES determination at step S103, the control flow proceeds to next step S104, while with a NO determination at step S103, the determination section 11 repeats the determination at step S103.

Figure 3:
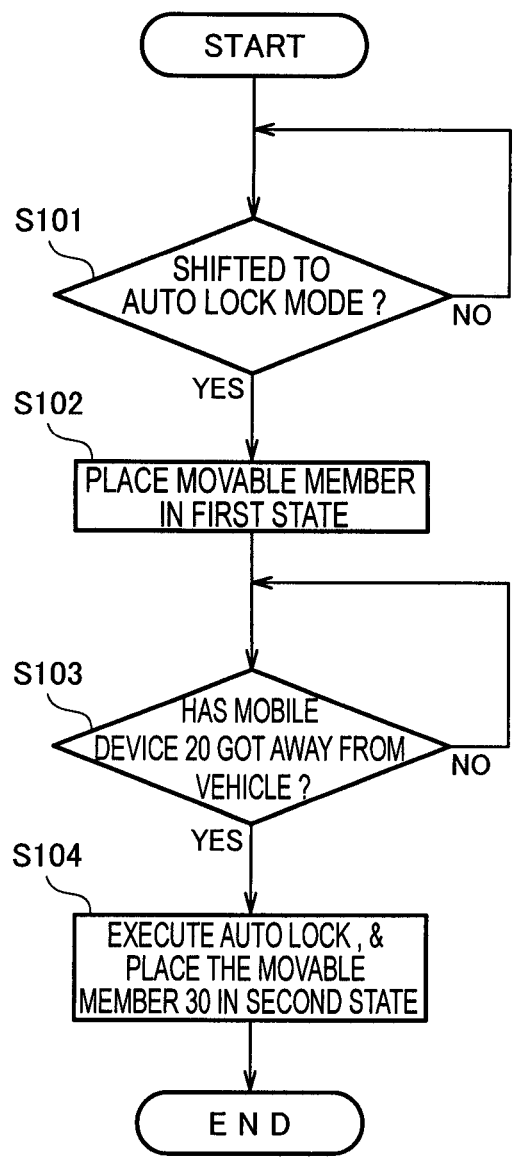
FIG. 3 is a control flow chart in a first embodiment of the smart entry system of the present invention.

At step S104, the control section 14 of the ECU 10 controls the door lock units 60 to lock the vehicle doors. Simultaneously, the control section 14 outputs a control signal such that the movable member 30 is placed in a second state. Thus, that the auto lock has been executed to lock the vehicle doors is informed to the passenger by the movable member 30 having shifted to another state (second state) changed relative to (different from) the first state which the movable member 30 shifted to in response to the vehicle shifting to the auto lock mode. Upon completion of the operation of step S104, the control flow of FIG. 3 is brought to an end.

In the first embodiment, any one of the following first to fourth control modes is activated depending on the type of the movable member 30.

2-1. Example Behavior of the First Control Mode in the First Embodiment

Figure 4:
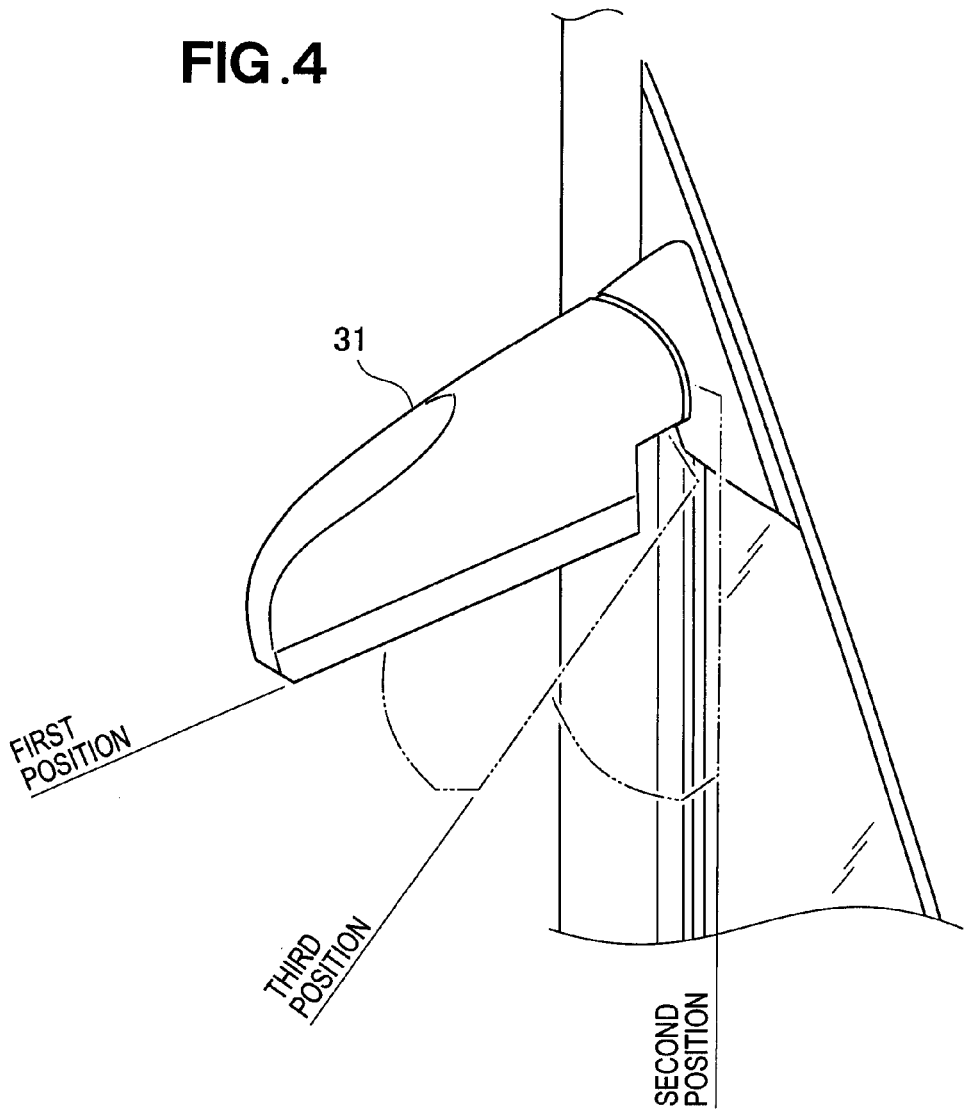
FIG. 4 is a view showing example behavior of a door mirror responsive to the vehicle shifting to an auto lock mode.

The following describe, with reference to FIG. 4, example behavior of the first control mode in the first embodiment. The first control mode is activated, i.e. the control section 14 operates in this first control mode, in the case where the movable member 30 is the electric folding door mirrors 31. Generally, two such electric folding door mirrors 31 are provided, one on a driver's seat door and one on an assistant driver's seat door. FIG. 4 shows the door mirror 31 provided on the assistant driver's seat door. During travel of the vehicle 1, for example, each of the electric folding door mirrors 31 is maintained in an opened position that is a first position shown by solid line in FIG. 4. Further, during parking of the vehicle 1, for example, each of the electric folding door mirrors 31 is maintained in a retracted or stored position that is a second position shown by two-dot-dash line in FIG. 4.

Once the determination section 11 of the ECU 10 determines that the vehicle 1 has shifted to the auto lock mode, the control section 14 places each of the door mirrors 31 in a first state, i.e. the control section 14 actuates each of the door mirrors 31 to a first state. The first state in this case is, for example, a state in which each of the door mirrors 31 has pivoted to and stopped at a third position between the above-mentioned first and second positions. Thus, the passenger can recognize that the vehicle has shifted to the auto lock mode, for example, by visually recognizing that each of the door mirrors 31 has pivoted from the first position to stop at the third position.

Then, once the determination section 11 of the ECU 10 determines that the mobile device 20 has got away from the vehicle 11, the control section 14 controls the door lock units 60, provided in corresponding relation to the doors, to thereby lock each of the doors. Once each of the doors is locked, the control section places each of the door mirrors in a second state, i.e. the control section actuates each of the door mirrors to a second state. The second state in this case is, for example, a state in which each of the door mirrors 31 has pivoted to and stopped at the above-mentioned second position. Thus, the passenger can recognize that the automatic lock function has been executed to lock each of the door mirrors 31, for example, by visually recognizing that each of the door mirrors 31 has been retracted or stored from the third position.

2-2. Example Behavior of the Second Control Mode in the First Embodiment

Figure 5:
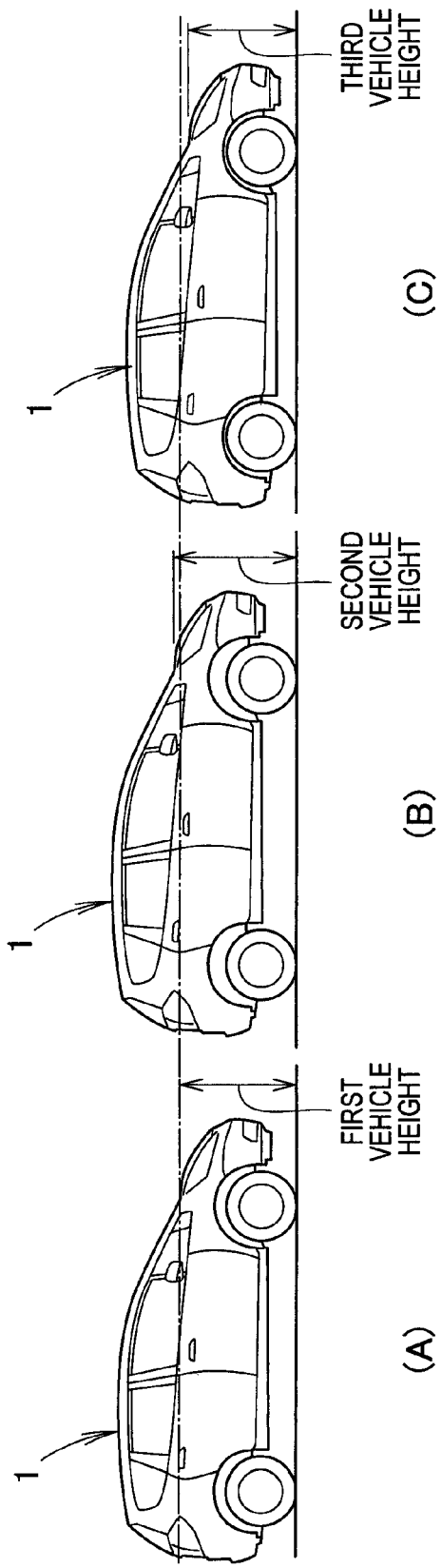
FIG. 5 is a diagram showing example changes in vehicle height responsive to the vehicle shifting to the auto lock mode.

The following describe, with reference to FIG. 5, example behavior of the second control mode in the first embodiment.

The control section 14 operates in this second control mode in the case where the movable member 30 is the vehicle height adjustment devices 32. The vehicle height adjustment devices 32 are, for example, in the form of air suspension devices provided near individual road wheels of the vehicle 1. The height of the vehicle 1 (vehicle height) is adjustable by the overall length of the air suspension devices being changed by control of air pressure etc. of the suspension devices. During travel of the vehicle 1, for example, the vehicle 1 is adjusted to a first vehicle height shown in (A) of FIG. 5.

Once the determination section 11 of the ECU 10 determines that the vehicle 1 has shifted to the auto lock mode, the control section 14 places each of the vehicle height adjustment devices 32 in a first state. The first state in this case is, for example, a state in which the overall length of each of the air suspension devices as the vehicle height adjustment devices 32 has been extended to change the vehicle height to a second vehicle height shown in (B) of FIG. 5 that is higher than the first vehicle height shown in (A) of FIG. 5. Thus, the passenger can recognize that the vehicle 1 has shifted to the automatic lock mode, for example, by visually recognizing that the vehicle 1 has shifted to the second vehicle height shown in (B) of FIG. 5.

Then, once the determination section 11 of the ECU 10 determines that the mobile device 20 has got away from the vehicle 11, the control section 14 controls the door lock units 60, provided in corresponding relation to the doors, to thereby lock each of the doors. Once each of the doors is locked, the control section places each of the vehicle height adjustment devices 32, for example, in a second state. The second state in this case is, for example, a state in which the overall length of each of the air suspension devices as the vehicle height adjustment devices 32 has been contracted to change the vehicle height to a third vehicle height shown in (C) of FIG. 5 that is lower than the above-mentioned first vehicle height. Thus, the passenger can recognize that the automatic lock function has been executed to lock each of the door mirrors 31, for example, by visually recognizing that the vehicle 1 having so far been at the second vehicle height shown in (B) of FIG. 5 has shifted to the third vehicle height shown in (C) of FIG. 5.

2-3. Example Behavior of the Third Control Mode in the First Embodiment

Figure 6:
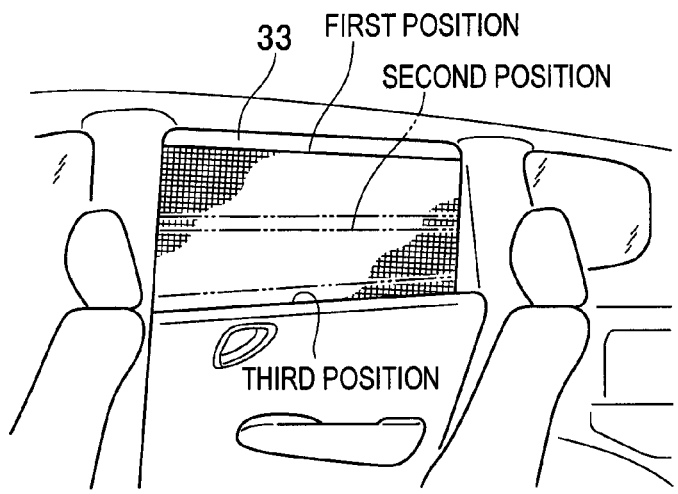
FIG. 6 is a view showing example behavior of a sun shade responsive to vehicle's shifting to the auto lock mode.

The following describe, with reference to FIG. 6, example behavior of the third control mode in the first embodiment. The control section 14 operates in this third control mode in the case where the movable member 30 is the electric sun shades 33. The electric sun shades 33 are provided in the passenger compartment, i.e. inward of the individual window glasses, of the vehicle 1. FIG. 6 shows the electric sun shades 33 provided inward of the window glass of a right rear seat. Each of the electric sun shades 33 is placed in a maximum pulled-out state by being positioned in a first position shown in FIG. 6 and placed in a retracted or stored state by being positioned in a third position shown in FIG. 6. Let it be assumed that, during travel of the vehicle, for example, each of the electric sun shades 33 is maintained in the first position so as to provide the greatest light shielding effect.

Once the determination section 11 of the ECU 10 determines that the vehicle has shifted to the auto lock mode, the control section 14 places each of the electric sun shades 33 in a first state. The first state in this case is, for example, a state in which each of the electric sun shades 33 has moved to and stopped at a second position between the above-mentioned first and third positions. Thus, the passenger can recognize that the vehicle 1 has shifted to the automatic lock mode, for example, by visually recognizing that each of the electric sun shades 33 has moved from the first position to the second position.

Then, once the determination section 11 of the ECU 10 determines that the mobile device 20 has got away from the vehicle 11, the control section 14 controls the door lock units 60, provided in corresponding relation to the doors, to thereby lock each of the doors. Once each of the doors is locked, the control section 14 places each of the electric sun shades 33 in a second state. The second state in this case is, for example, a state in which each of the electric sun shades 33 has moved to the third position to stop at the third position. Thus, the passenger can recognize that the auto lock function has been executed to lock each of the doors, for example, by visually recognizing that each of the electric sun shades 33 has moved from the second position to the third position.

2-4. Example Behavior of the Fourth Control Mode in the First Embodiment

Figure 7:
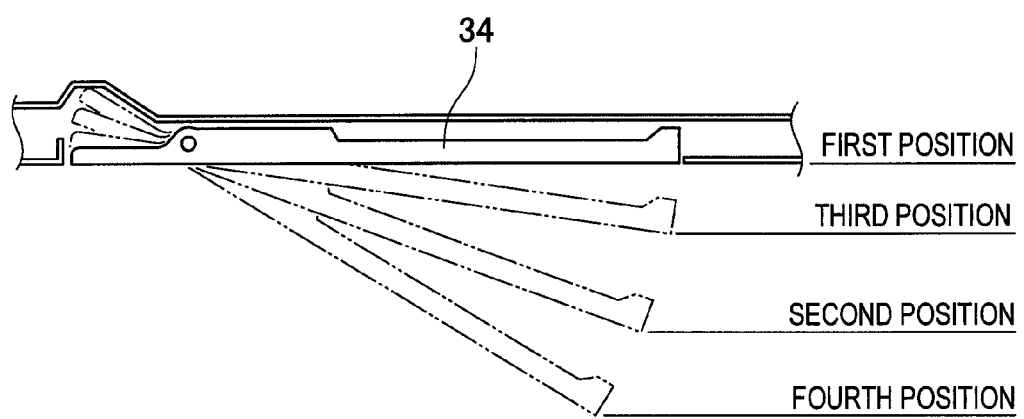
FIG. 7 is a view showing example behavior of a pop-up door handle responsive to vehicle's shifting to the auto lock mode.

The following describe, with reference to FIG. 7, example behavior of the fourth control mode in the first embodiment. The control section 14 operates in this fourth control mode in the case where the movable member 30 is the pop-up door handles 34. The pop-up door handles 34 are provided on the individual doors of the vehicle 1 and stored in a first position shown in FIG. 7 when the doors are in the locked state. As the doors are unlocked, the door handles 34 project to and stop at, for example, a second position shown in FIG. 7. By the passenger grabbing and pulling the door handle 34, for example, to a fourth position in FIG. 7, the passenger can open the door.

Once the determination section 11 of the ECU 10 determines that the vehicle has shifted to the auto lock mode, the control section 14 places each of the door hands 34 in a first state. The first state in this case is, for example, a state in which each of the door handles 34 has pivoted to and stopped at, for example, a third position between the above-mentioned first and second positions. Thus, the passenger can recognize that the vehicle has shifted to the auto lock mode, for example, by recognizing that each of the door handles 34 has pivoted from the second position to stop at the third position.

Then, once the determination section 11 of the ECU 10 determines that the mobile device 20 has got away from the vehicle 11, the control section 14 controls the door lock units 60, provided in corresponding relation to the doors, to thereby lock each of the doors. Once each of the doors is locked, the control section places each of the door mirrors, for example, in the second state. The second state in this case is, for example, a state in which each of the door mirrors 31 has pivoted to and stopped at the above-mentioned first position. Thus, the passenger can recognize that the automatic lock function has been executed to lock each of the door mirrors 31, for example, by visually recognizing that each of the door handles 34 having so far been in the second position has been stored into the first position.

The foregoing have described the first to fourth control modes in the first embodiment. With the aforementioned arrangements, the passenger can readily visually recognize a predetermined state of the door mirrors 31, controlled in the first control mode, irrespective of whether the passenger is present near the vehicle 1 or away from the vehicle 1. Because the door mirrors 31 are necessarily maintained in the opened state (first position in FIG. 4), the intermediate position (second position) can be defined with ease. Therefore, the first control mode for controlling the door mirrors 31 is the most optimal control mode in the first embodiment of the smart entry system of the present invention.

3. Second Embodiment

The second embodiment is characterized by controlling the degree of light transmission of the window glasses 50 so that the passenger can recognize an operating state of the auto lock function by visually recognizing the degree of light transmission of the window glasses 50. Because the window glasses 50 have a high degree of light transmission and thus is substantially transparent during travel of the vehicle 1, for example, the second embodiment can secure a good view through the window glasses 50 during the travel. Further, because the window glasses 50 have a low degree of light transmission and thus is opaque during parking of the vehicle 1, for example, the second embodiment can achieve an increased security effect by preventing any unauthorized persons from looking for things for a theft purpose. In this case, once the vehicle shifts to the auto lock mode, the window glasses 50 are placed in a degree of light transmission or state different from the high degree of light transmission (transparent state) of the window glasses 50 during the travel and the lower degree of light transmission (opaque state) of the window glasses 50 during the parking. Such a degree of light transmission or state different from the high degree of light transmission (transparent state) of the window glasses 50 during the travel and the lower degree of light transmission (opaque state) of the window glasses 50 during the parking is referred to as a first degree of light transmission, and that the lower degree of light transmission (opaque state) of the window glasses 50 during the parking is referred to as a second degree of light transmission.

Figure 8:
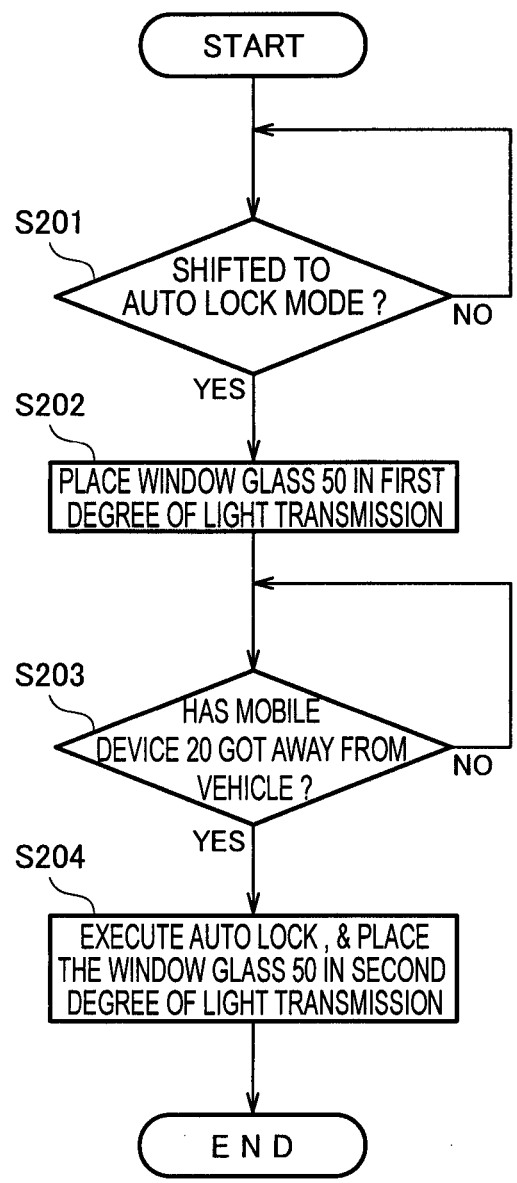
FIG. 8 is a control flow chart in a second embodiment of the smart entry system of the present invention.

The following describe, with reference to FIG. 8, example behavior of the second embodiment of the smart entry system of the present invention. At step S201, the determination section 11 of the ECU 10 determines whether or not the vehicle has shifted to the auto lock mode, i.e. whether or not the transmission/reception section 12 of the ECU 10 has received the first reply signal including an ID matching the ID of the ECU 10. With a YES determination at step S201, the control flow proceeds to next step S202, while with a NO determination at step S201, the determination section 11 repeats the determination at step S201.

At step S202, the control section 14 of the ECU 10 outputs a control signal such that the window glasses 50 are placed in the first degree of light transmission. Thus, that the vehicle has shifted to the auto lock mode is informed to the passenger by the window glasses 50 having shifted to a state changed relative to (i.e., different from) the state which the window glasses 50 were in before the vehicle shifting to the auto lock mode.

At next step S203, the determination section 11 of the ECU 10 determines whether the mobile device 20 has got away from the vehicle 1, i.e. whether or not the transmission/reception section 12 of the ECU 10 has received the third reply signal including an ID matching the ID of the ECU 10. With a YES determination at step S203, the control flow proceeds to next step S204, while with a NO determination at step S203, the determination section 11 repeats the determination at step S203.

At step S204, the control section 14 of the ECU 10 controls the door lock units 60 to lock the vehicle doors. Simultaneously, the control section 14 outputs a control signal such that the window glasses 50 are placed in the second degree of light transmission (opaque state). Thus, that the auto lock has been executed to lock the vehicle doors is informed to the passenger by the window glasses 50 being placed in the second degree of light transmission. Upon completion of the operation of step S204, the control flow of FIG. 8 is brought to an end.

In the second embodiment, the control section 14 operates in any one of the following first and second control modes depending on a desired display style in the first degree of light transmission on at least one of the window glasses 50.

3-1. Example Behavior of the First Control Mode in the Second Embodiment

Figure 9:
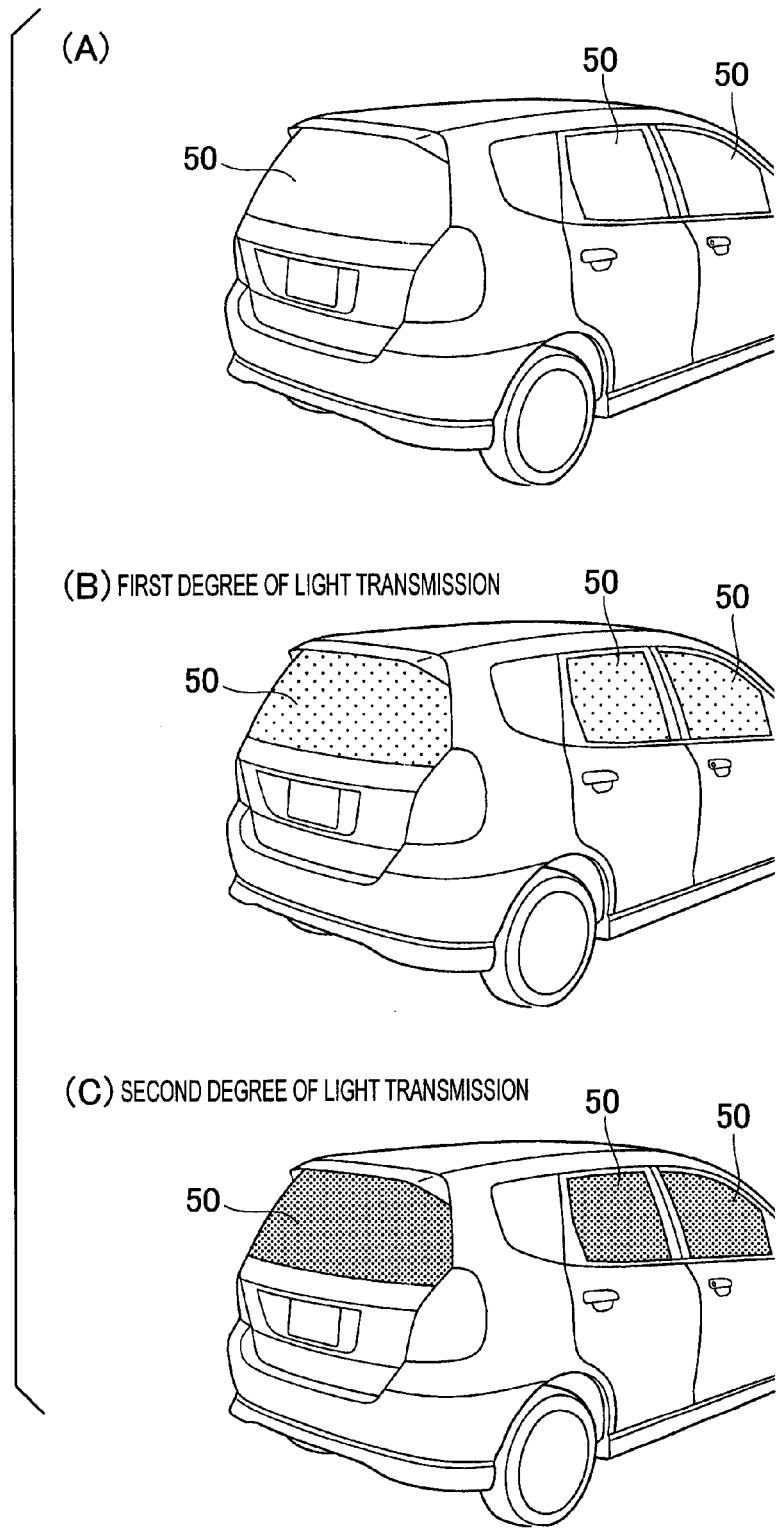
FIG. 9 is a view showing example changes in degree of light transmission of a window glass responsive to vehicle's shifting to the auto lock mode.

The following describe, with reference to FIG. 9, example behavior of the first control mode in the second embodiment. The control section 14 operates in this first control mode in a case where the degree of light transmission is to be changed in a progressive manner.

Once the determination section 11 of the ECU 10 determines that the vehicle has shifted to the auto lock mode, the control section 14 controls the window glasses 50, for example, in such a manner that at least one of the window glasses 50 shifts to a translucent state between the transparent state and the opaque state. Thus, the passenger can recognize that the vehicle has shifted to the auto lock mode, for example, by recognizing that the at least one of the window glasses 50 having so far been transparent shifts to the first degree of light transmission shown in (B) of FIG. 9.

Then, once the determination section 11 of the ECU 10 determines that the mobile device 20 has got away from the vehicle 1, the control section 14 of the ECU 10 controls the door lock units 60 to lock the vehicle doors. Once each of the vehicle doors is closed, the control section 14 controls the window glasses 50, for example, in such a manner that at least one of the window glasses 50 shifts to opaque. Thus, the passenger can recognize that the auto lock function has been executed to lock each of the vehicle doors, for example, by recognizing that the at least one of the window glasses 50 having so far been translucent shifts to the second degree of light transmission (opaque state).

3-2. Example Behavior of the First Control Mode in the Second Embodiment

Figure 10:
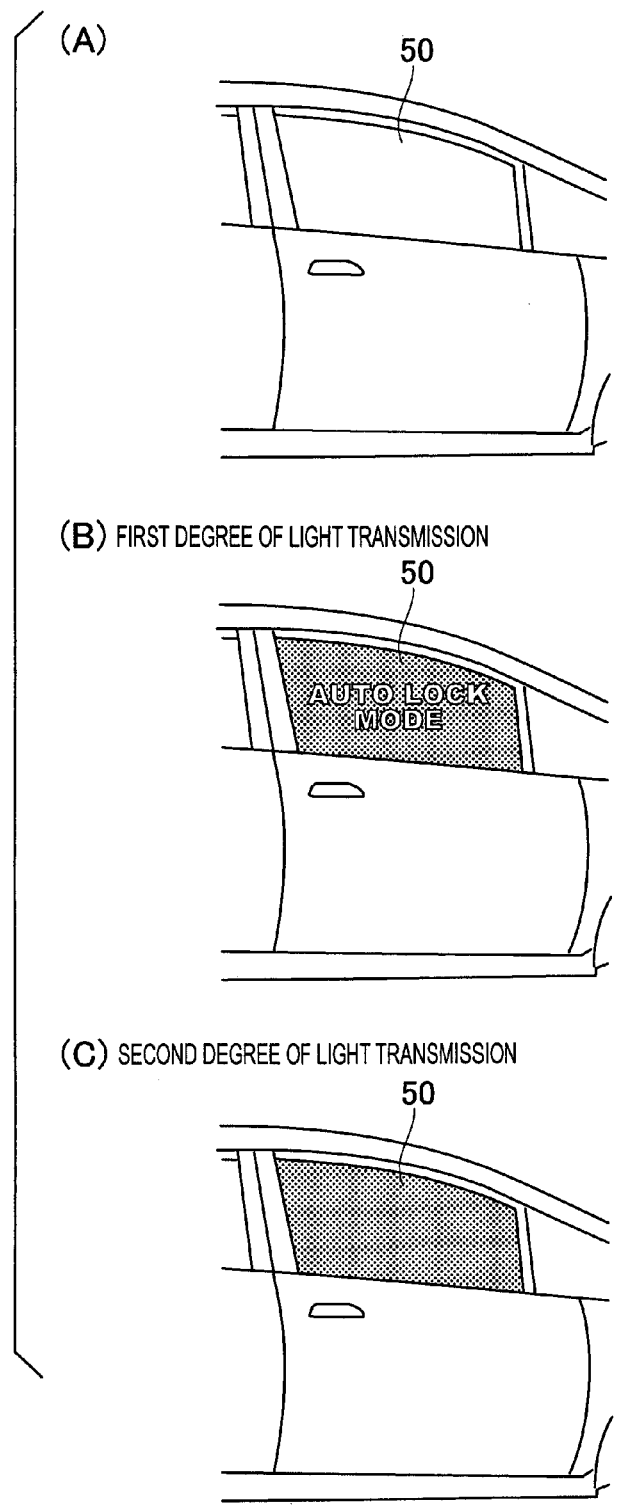
FIG. 10 is a view showing an example display on the window glass and changes in degree of light transmission of the window glass responsive to vehicle's shifting to the auto lock mode.

The following describe, with reference to FIG. 10, example behavior of the second control mode in the second embodiment. The control section 14 operates in this second control mode in a case where at least one character/letter or the like is to be displayed on at least one of the window glasses 50 when the vehicle has shifted to the auto lock mode.

Once the determination section 11 of the ECU 10 determines that the vehicle has shifted to the auto lock mode, the control section 14 controls the window glasses 50, for example, in such a manner that at least one of a character/letter (characters/letters), figure and design is displayed on at least one of the window glasses 50. Thus, the passenger can recognize that the vehicle has shifted to the auto lock mode, for example, by recognizing that letters like "AUTO LOCK MODE" have been displayed (as an example of the display in the first degree of light transmission shown in (B) of FIG. 10) on the at least one of the window glasses 50 having so far been transparent.

Then, once the determination section 11 of the ECU 10 determines that the mobile device 20 has got away from the vehicle 1, the control section 14 of the ECU 10 controls the door lock units 60 to lock the vehicle doors. Once each of the vehicle doors is closed, the control section 14 controls the window glasses 50, for example, in such a manner that at least one of the window glasses 50 shifts to the degree of light transmission of the opaque state. Thus, the passenger can recognize that the auto lock function has been executed to lock each of the vehicle doors, for example, by recognizing that the window glass 50 having the letters like "AUTO LOCK MODE" displayed thereon shifts to the opaque state (i.e., to the second degree of light transmission shown in (C) of FIG. 10).

4. Modifications

The first embodiment has been described above separately for each of the first to fourth control modes. Note, however, that any two or more of the first to fourth control modes may be combined so that the two or more of the first to fourth control modes are activated simultaneously. For example, any two or more of the control modes may be combined so that the door mirrors are placed in the second state once the vehicle shifts to the auto lock mode and the vehicle is placed in the second vehicle height once the vehicle doors are locked.

Further, whereas the first embodiment has been described above in relation to the first to fourth control modes, the present invention is not so limited, and the first embodiment may employ other control modes, such as a fifth control mode in which a not-shown windshield wiper is operated in a desired manner and a sixth control mode in which a not-shown radio antenna is operated in a desired manner.

Further, control for illuminating or blinking the security indicator 40 provided on the not-shown meter panel, steering column or the like may be performed in combination of any of the aforementioned control modes in the first embodiment. For example, once the vehicle shifts to the auto lock mode, control may be performed such that not only the door mirrors 31 are placed in the first state but also the security indicator 40 provided on the not-shown steering column is blinked. After that, in response to the doors of the vehicle 1 being locked, control may be performed such that not only the door mirrors 31 are placed in the second state but also the security indicator 40 provided on the not-shown steering column is turned off.

Furthermore, whereas the first and second embodiments have been described above separately from each other, the first and second embodiments may be combined so that the two embodiments are carried out simultaneously.

It should be appreciated that the present invention is not limited to the above-described embodiments and various modifications of the invention are also possible without departing from the spirit and scope recited in the appended claims.

What is claimed is:

1. A smart entry system having an auto lock mode in which an auto lock function to automatically lock at least one door of a vehicle is executed in response to detection that a mobile device associated with the auto lock function has got away from the vehicle, the smart entry system comprising:
    at least one movable member provided on the vehicle in such a manner as to be visually recognizable from outside the vehicle; and
    a control section that, once the vehicle shifts to the auto lock mode, actuates the at least one movable member to a first state, the first state being different from a state of the at least one movable member before the vehicle shifts to the auto lock mode,
    wherein once the auto lock function is executed and the at least one door is locked, the control section actuates the at least one movable member to a second state which is different from the first state and the state before the vehicle shifts to the auto lock mode.

2. The smart entry system according to claim 1, wherein the at least one movable member is at least one electric folding door mirror of the vehicle, the first state is where the at least one electric folding door mirror of the vehicle is in a third position between a first position that is an opened position of the door mirror and a second position that is a stored position of the door mirror, and the second state is where the at least one electric folding door mirror is in the second position that is the stored position of the door mirror.

3. The smart entry system according to claim 1, wherein the at least one movable member is vehicle height adjustment devices of the vehicle, the first state is where the vehicle is held by the vehicle height adjustment devices at a second vehicle height having changed relative to a first vehicle height before the vehicle shifts to the auto lock mode and/or a third vehicle height after automatic locking of the door, and the second state is where the vehicle is held at the third vehicle height after automatic locking of the door.

4. The smart entry system according to claim 1, wherein the at least one movable member is at least one electric sun shade provided in a passenger compartment of the vehicle adjacent to a window glass of the vehicle, the first state is where the sun shade is in a pull-out state having changed relative to a pull-out state before the vehicle shifts to the auto lock mode and/or a pulled-out state after automatic locking of the door, and the second state is where the sun shade is in the pull-out state after automatic locking of the door.

5. The smart entry system according to claim 1, wherein the at least one movable member is a pop-up door handle provided on the at least one door, the first state is where the pop-up door handle is in a projected state having changed relative to a projected state before the vehicle shifts to the auto lock mode and/or a projected state after automatic locking of the door, and the second state is where the pop-up handle is in the projected state after automatic locking state.

6. The smart entry system according to claim 1, wherein, once the vehicle shifts to the auto lock mode, the control section not only actuates the at least one movable member to the first state but also illuminates or blinks a lamp provided on a predetermined position of the vehicle visually recognizable from outside a passenger compartment.

7. A smart entry system having an auto lock mode in which an auto lock function to automatically lock at least one door of the vehicle is executed in response to detection that a mobile device associated with the auto lock function has got away from the vehicle, the smart entry system comprising:

at least one window glass of the vehicle; and a control section that controls a degree of light transmission of the at least one window glass in conjunction with the auto lock mode, wherein, once the vehicle shifts to the auto lock mode, the control section controls the degree of light transmission of the at least one window glass to change to a first degree of light transmission different from a degree of light transmission before the vehicle shifts to the auto lock mode, and wherein, once the auto lock function is executed and the at least one door of the vehicle is locked, the control section controls the degree of light transmission of the at least one window glass to change to a second degree of light transmission different from the first degree of light transmission and the degree of light transmission before the vehicle shifts to the auto lock mode.

8. The smart entry system according to claim 7, wherein the first degree of light transmission is a degree of light transmission of a predetermined portion of the at least one window glass, and the predetermined portion of the at least one window glass visually displays thereon at least one of a character/letter, figure and design.

* * * * *